United States Patent

Aoki

[15] 3,661,459
[45] May 9, 1972

[54] SYSTEM FOR PREVENTING COLLISION OF VEHICLES

[72] Inventor: Masao Aoki, Amagasaki, Japan

[73] Assignee: Mitsubishi Denki Kabushiki Kaisha, Chiyoda-ku, Tokyo, Japan

[22] Filed: Sept. 10, 1970

[21] Appl. No.: 70,996

[52] U.S. Cl. ....................................................356/4, 356/5
[51] Int. Cl. .........................................................G01c 3/08
[58] Field of Search ..............356/4, 5, 28; 343/112 CA, 7.3, 343/13

[56] References Cited

UNITED STATES PATENTS

| | | | |
|---|---|---|---|
| 3,134,975 | 4/1964 | Goodman | 343/112 CA |
| 3,545,861 | 12/1970 | Farnsworth et al. | 356/5 |
| 3,114,145 | 12/1963 | Vielle et al. | 343/112 CA |
| 2,804,160 | 8/1957 | Rashid | 343/112 CA |
| 3,112,480 | 11/1963 | Lakatos | 343/112 CA |

*Primary Examiner*—Benjamin A. Borchelt
*Assistant Examiner*—S. C. Buczinski
*Attorney*—Robert E. Burns and Emmanuel J. Lobato

[57] ABSTRACT

A motor vehicle sends a train of laser light pulses with a fixed repetition period and receives the pulses reflected from a preceding vehicle. The received pulses are converted to an electrical signal and applied to a gate circuit gated with the repetition period of the laser light pulses and with a time delay determined by the speed of the vehicle. Those signal portions resulting from the received pulses and passed through the gate circuit are held in peak value and integrated providing an intervehicular distance indication.

2 Claims, 18 Drawing Figures

3,661,459

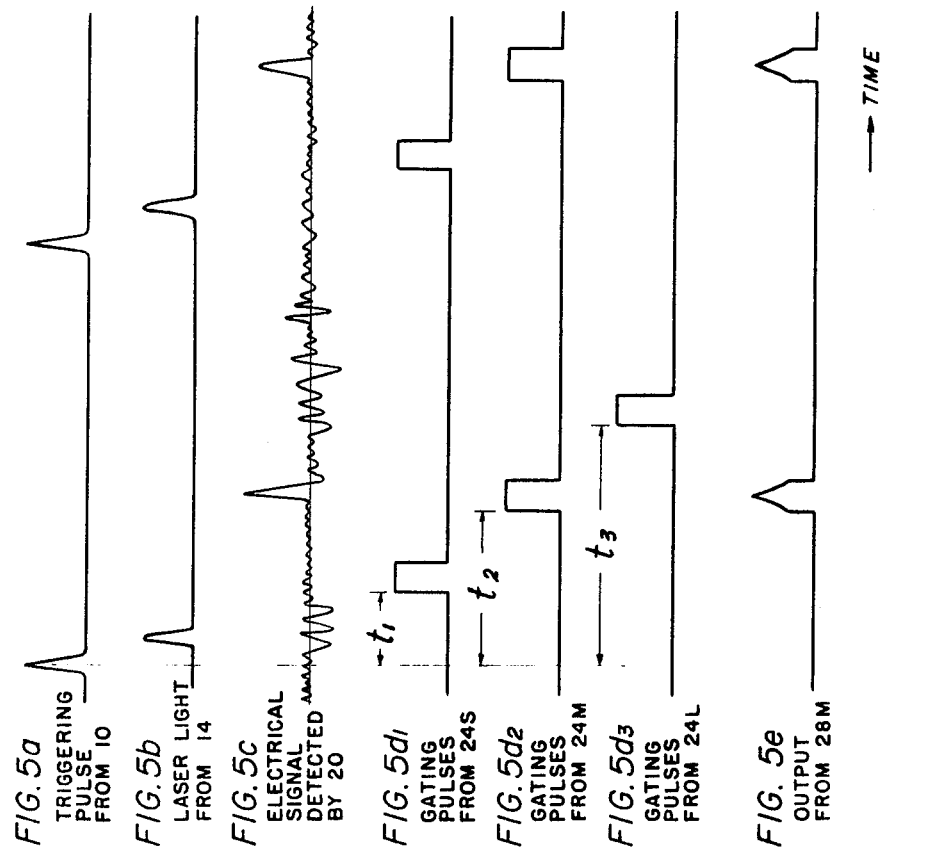
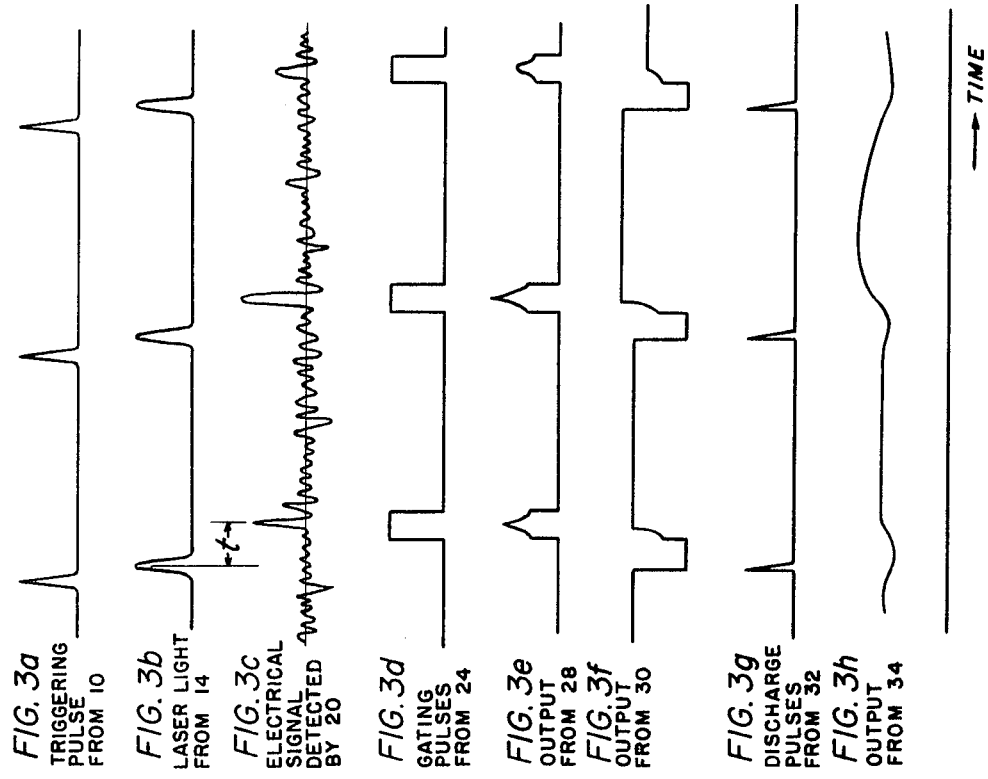

SYSTEM FOR PREVENTING COLLISION OF VEHICLES

BACKGROUND OF THE INVENTION

This invention relates to a system for preventing transport facilities such as motor vehicles from colliding with each other.

The measurement of a distance between a motor vehicle and a preceding vehicle or a frontward obstacle has heretofore relied upon the eye measurement performed by the operator on the one motor vehicle. This has been disadvantageous in that the measurements are inaccurate and also impossible to be made during the nighttime. Therefore serious accidents might be easily caused. It is highly desirable to provide means for accurately and reliably measuring a distance between a motor vehicle and a preceding vehicle or a frontward obstacle regardless of light conditions.

SUMMARY OF THE INVENTION

Accordingly it is a general object of the invention to eliminate any error due to a measurement of distance with the eye thereby to ensure that transport facilities such as motor vehicles are safely operated.

It is another object to provide a new and improved system for preventing a motor vehicle from colliding with a preceding vehicle or an obstacle located ahead thereof including means for determining a distance between a motor vehicle and a preceding vehicle or a frontward obstacle, or indicating the presence of the preceding vehicle or obstacle through the use of a laser light, an electromagnetic wave or an ultrasonic wave.

It is another object of the invention to provide a new and improved system for preventing a motor vehicle from colliding with a preceding vehicle or a frontward obstacle including means responsive to a signal of laser light or electromagnetic wave or ultrasonic wave received by the motor vehicle which has emitted that signal, to effect an indication of an alarm to the operator, or the generation thereof, or to apply a braking action to the motor vehicle thereby automatically to acquaint the operator with a danger or to stop the vehicle.

It is still another object of the invention to provide a new and improved system for preventing a motor vehicle from colliding with a preceding vehicle or a frontward obstacle including means for indicating a degree of danger, or generating a signal therefor or applying a braking action to the motor vehicle in accordance with the magnitude of the speed of the vehicle.

The invention accomplishes these objects by the provision of a system for preventing a collision of motor vehicles, comprising a motor vehicle equipped with the preventing system, triggering generator means for generating a train of triggering pulses having a predetermined pulse repetition period, search generator means controlled by the triggering generator means to generate a train of search waves having the same pulse repetition period as the triggering pulses and direct the search waves toward a target, and detector means for detecting the search waves reflected from the target, characterized by a gate circuit gated with a period identical to the pulse repetition period of the triggering pulses to pass therethrough only those signal portions due to the search waves detected by the detector means, those signal portions passed through the gate circuit providing a measure of a distance between the motor vehicle and the target.

In a preferred embodiment of the invention the system for preventing collision of motor vehicles may comprise, on a motor vehicle, triggering generator means for generating a train of triggering pulses having a predetermined pulse repetition period, laser means energized with the train of triggering pulses to emit a train of laser beams having the same pulse repetition period as the triggering pulses, a first optical system for directing the train of laser beams from the laser means to a target, a second optical system for receiving the laser beams reflected from the target, optical detector means for detecting the laser beams received by the second optical system, and a gate circuit gated with a period identical to the pulse repetition period of the triggering pulses to pass therethrough only those signal portions due to the laser beams detected by the optical detector means, those signal portions passed through the gate circuit providing a measure of a distance between the motor vehicle and the target.

Advantageously the gate circuit may be gated once for each of the triggering pulses with a time delay relative thereto determined by the speed of the vehicle as detected by a speed detector, and means may be provided for responding to those signal portions passed through the gate circuit to indicate an alarm, generate a signal therefor, or apply a braking action to the motor vehicle.

BRIEF DESCRIPTION OF THE DRAWINGS

The invention will become more readily apparent from the following detailed description taken in conjunction with the accompanying drawings in which:

FIGS. 3a–3h are graphs illustrating waveforms developed at various points in the arrangement shown in FIG. 1;

FIGS. 5a–5e are graphs illustrating waveforms developed at various points in the arrangement shown in FIG. 4.

DESCRIPTION OF THE PREFERRED EMBODIMENTS

Figure 1:
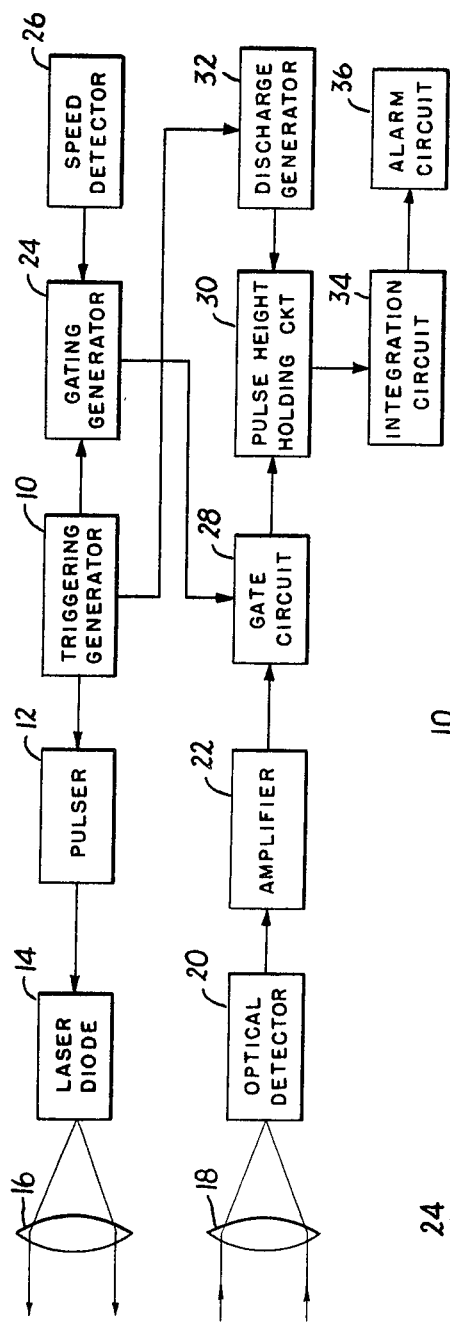
FIG. 1 is a block diagram of a system for preventing collision of motor vehicles constructed in accordance with the principles of the invention.

Referring now to FIG. 1 of the drawings, it is seen that an arrangement disclosed herein comprises a triggering generator 10 for generating a train of triggering pulses having a predetermined pulse repetition period, a pulser 12 connected to the triggering generator 10 to respond to the triggering pulses from the triggering generator to form current pulses, a semiconductor laser diode 14 driven with the current pulses from the pulser 12 to emit a train of laser beams having the same pulse repetition period as the triggering pulses from the triggering generator 10, and a transmitting optical system 16 for collimating the laser light from the laser diode 14 and directing the collimated light toward any target such as a preceding motor vehicle or an obstacle located ahead thereof although such a vehicle or target is not illustrated.

A receiving optical system 18 focusses a beam of laser light reflected from the target upon an optical detector 20 such as a phototransistor connected to an amplifier 22.

The triggering generator 10 is also connected to an input to a gating generator 24 which is, in turn, triggered with the triggering pulses from the generator 10 to generate train of gating pulses having a predetermined duration under the control of a speed detector 26 such as a tachometer generator. The speed detector 26 is operative to detect a speed of the associated motor vehicle to convert the detected speed to a voltage, for example, serving to determine when the gating generator 24 generates the gating pulse.

The gating pulses from the gating generator 24 are applied to a gate circuit 28 connected to gate it once for each pulse. The gate circuit 28 has another input connected to the amplifier 22 and is connected at the output to a pulse height holding circuit 30.

The triggering generator 10 further supplies the triggering pulses to a discharge generator 32 which, in turn, controls the holding circuit 30 in the manner as will be described later. The pulse height holding circuit 30 is connected to an integration circuit 34, subsequently connected to an alarm circuit 36.

Figure 2:
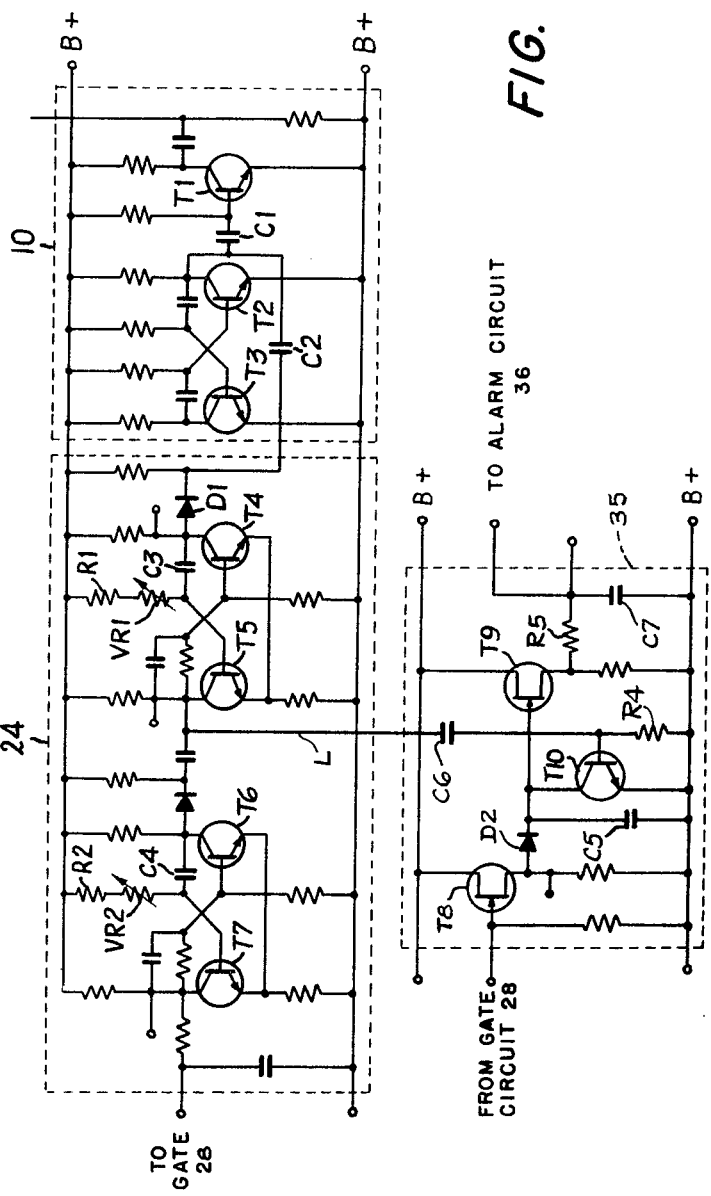
FIG. 2 is a circuit diagram of one portion of the arrangement shown in FIG. 1.

FIG. 2 illustrates the details of one portion of the arrangement shown in FIG. 1. As shown in FIG. 2, the triggering generator 10 comprises an astable multivibrator including a pair of transistors T2 and T3 interconnected in the manner as shown to effect the self-oscillation at a frequency of about 20 hertz for example to provide a train of triggering pulses at the collector electrode of the transistor T2. The triggering pulses are applied via a capacitor C1 to a pulse shaping transistor T1 and then to the pulser 12. The pulser 12 may comprise a thyristor fired with the pulse from the transistor T1 and a capacitor charged to a high voltage. During the conduction of the thyristor the capacitor discharges through an inductance connected thereto whereby a resonance circuit formed of the capacitor and the inductance tends to effect a damped oscillation. However after one-half cycle of the oscillation, the capacitor reversely charges to turn off the thyristor whereupon the charge on the capacitor discharges through the inductance to provide the abovementioned current. For purpose of simplicity, the thyristor, capacitor and inductance are not shown in FIG. 2.

The triggering pulses are also applied to the gating generator 24 through a capacitor C2. The gating generator 24 is shown in FIG. 2 as comprising a first monostable multivibrator including a pair of transistors T4 and T5 interconnected in the manner as shown and a second monostable multivibrator including a pair of transistors T6 and T7 interconnected in the manner as shown. Each of the triggering pulses from the triggering generator 10 is applied through the capacitor C2 and a semiconductor diode D1 to the first multivibrator T5–T6 to trigger it to provide a first positive pulse having a duration determined by a resistor R1, a variable resistor VR1 and a capacitor C3. The second monstable multivibrator T6–T7 is responsive to the tailing edge of the first positive pulse just described to be triggered thereby to produce a second positive pulse having a duration determined by a resistor R2, a variable resistor VR2 and a capacitor C4. This pulse corresponds to the waveform $d$ shown in FIG. 3.

The variable resistor VR1 has a magnitude of resistance controlled with the output from the speed detector 26 whereby the duration of the first pulse varies with the output from the speed detector 26 and therefore the detected speed of the motor vehicles. Accordingly, a time point at which the second positive pulse begins to be developed or the leading edge thereof relative to the corresponding triggering pulse is determined in accordance with the vehicle's speed.

The second positive pulses are applied to the gate circuit 28 which may be a transistor. With the gate circuit 28 formed of a transistor, the second or gating pulses can be supplied to a base electrode of the transistor to render it conducting. The transistor includes a collector electrode connected to the amplifier 22. Therefore when conducting, the transistor permits the output from the amplifier 22 to pass to the pulse height holding circuit 30 therethrough.

While FIG. 1 shows functionally the components 30, 32, and 34 in separate blocks, FIG. 2 illustrates them in a common block designated by the reference numeral 35. The output from the gate circuit 28 is supplied to a gate electrode of a field effect transistor T8 where it is impedance-converted. Then it is applied via a semiconductor diode D2 to a pulse height holding capacitor C5 to charge it. It is noted that the diode D2 has the reverse polarity with respect to the charge on the capacitor C5 and a field effect transistor T9 connected at the gate electrode to the junction of the diode D2 and the capacitor C5 has a very high resistance across the gate and source electrodes thereof so that the charge accumulated on the capacitor C5 is left just as it is. That is, the peak value of the signal applied to the transistor T8 is maintained by the charged capacitor C5. Therefore it will be appreciated that the diode D2, the capacitor C5 and the field effect transistor T9 form the pulse height holding circuit 30.

As shown in FIG. 2, the output of the first monostable multivibrator in the gating generator 24 is connected via a lead L to a base electrode of a normally nonconducting transistor T10 through a capacitor C6, and the collector electrode thereof is connected to the junction of the capacitor and the gate electrode of the field effect transistor T9. Therefore each time the output pulse from the first monostable multivibrator or the collector electrode of the transistor T5 is applied to the transistor T10 the latter is turned on with a time delay determined by the capacitor C6 and a resistor R4 in series thereto. Thus the capacitor C5 discharges through the now conducting transistor T10, until the capacitor C5 reaches a null voltage condition. Therefore it will be appreciated that the transistor T10, the capacitor C6 and the resistor R4 form the discharge generator 32.

The field effect transistor T9 includes a source electrode connected to the integration circuit 34 formed of a resistor R5 and a capacitor C7.

FIG. 2 illustrates by way of example the components 10, 24, 30, 32 and 34. Therefore it is to be understood that the invention is not restricted to the arrangement as shown in FIG. 2.

The operation of the arrangement illustrated will now be described in conjunction with FIGS. 1 and 3. As above described, the triggering generator 10 generates a train of triggering pulses having a predetermined pulse repetition period such as shown at waveform $a$ in FIG. 3. The train of pulse is then supplied through to the pulser 12 to the laser diode 14 to emit a train of laser beams therefrom such as shown at waveform $b$ in FIG. 3. The laser beams are identical in pulse repetition period to the triggering pulses from the triggering generator 10 and collimated and directed toward a target such as a motor vehicle (not shown) by the transmitting optical system 16.

The receiving optical system 18 receives the laser beams reflected from the target and focusses them upon the optical detector 20. The beam of light received by the optical detector 20 includes those signal portions in the form of pulses resulting from the laser beams reflected from the target and relatively high in amplitude, and the optical noise superposed thereon such as shown at waveform $c$ in FIG. 3. Therefore the corresponding electrical signal provided by the detector 20 has a similar waveform. It will readily be understood that the longer a distance between the motor vehicle equipped with the present system and a target and also the lower the reflection factor of the target the lower the signal-to-noise ratio of the received signal will be. Therefore it becomes difficult to detect distant targets and those low in reflection factor, that is to say, to receive lights reflected from them.

According to the principles of the invention, the gating generator 24 and the gate circuit 28 have been provided in order to improve the signal-to-noise ratio of the received signal. More specifically, assuming that $c$ represents the velocity of light and $d$ represents a distance between the motor vehicle equipped with the present system and a target, a time interval $t$ equal to $2d/c$ should lapsed after one beam has been emitted from the laser diode 14 and reflected from the target until it reaches the optical detector 20. If an electrical signal portion for such a beam thus time delayed reaches the gate circuit 28 just gated with the corresponding gating pulse from the gating generator 24 during a suitable time interval, then the gate circuit 28 can extract the signal portion due to the received beam resulting in an increase in signal-to-noise ratio. In other words, the signal portions caused from the received laser beams are required to be supplied to the gate circuit 28 simultaneously with the application of the corresponding gating pulses thereto. This results in the necessity of determining time points when the gating generator 24 is to generate the pulses with a suitable duration as shown at waveform $d$ in FIG. 3.

On the other hand, an alarm signal must be produced whenever any danger may be caused. If a motor vehicle equipped with the present system is high in speed, such a danger is required to be known early enough while the particular intervehicular distance is still maintained long. For low speeds, however, the intervehicular distance may be chosen to be short. Therefore it is required only to preliminarily determine dangerous distances in accordance with the speeds of the motor vehicle and to give an alarm and/or apply a braking action to the vehicle when the dangerous distance predetermined by the particular speed of the vehicle has been reached.

To this end, the speed detector 26 has been provided to detect and convert the speed of the motor vehicle to a voltage for example. As above described in conjunction with FIG. 2, that voltage then controls the gating generator 24 to generate a train of pulses equal in pulse repetition period to the triggering pulses from the triggering generator 10 at time points determined by that voltage as shown at waveform d in FIG. 3. That is, the gating generator 24 is arranged to generate the train of gating pulses d at suitable time points with a suitable time delay relative to the triggering pulses a determined in accordance with the detected speed while the coincidence of the gating pulses with signals portions due to the corresponding laser beams reflected from a target causes an alarm signal to be given.

The train of gating pulses d from the gating generator 24 is applied to the gate circuit 28 having also the received signal c applied thereto through the amplifier 22. Since the gate circuit 28 permits that portion of the received signal coinciding with the gating pulse to pass therethrough as above described in conjunction with FIG. 2, only those signal portions due to the received laser beams coinciding with the corresponding gating pulses can be separated from the received signal including the noise as shown at waveform e in FIG. 3. In this case, if the gating pulses have a duration substantially equal to or less than the duration of the laser beams emitted from the laser diode 14 then the signal portions passed through the gate circuit 28 are substantially free from the noise resulting in an increase in signal-to-noise ratio. In other words, as a result of the provision of the gate circuit 28, the signal-to-noise ratio is improved and thereby a considerably weak signal is possible to be detected. Specifically, it is possible to detect any target such as a preceding motor vehicle or an obstacle distant or low in reflection factor.

An integration circuit having a time constant large enough with respect to the repetition period of the laser beam used may also be employed in the system. This measure is useful for improving the signal-to-noise ratio of the received signal.

The term "noise" as used herein is intended to include received light signals reflected from unnecessary objects appearing during the travel of the vehicle along roads, that is to say temporary obstacles such as trees, poles etc. traversing the radiated laser beams for short time intervals during its travel along curved roads.

Then the signal e leaving the gate circuit 28 is applied to the pulse height holding circuit 30 where it is converted to a signal having held the peak value of the signal e as above described in conjunction with FIG. 2 and as shown at waveform f in FIG. 3. Under these circumstances, the signal portions due to the received laser beams may disappear while the holding circuit 30 continues to hold the peak value of that signal due to the preceding laser beams which is objectionable. In order to avoid this objection, the discharge generator 32 is adapted to generate a train of discharge pulses under the control of the triggering generator 10 as shown at waveform g in FIG. 3. As above described in conjunction with FIG. 2, the discharge generator 32 is triggered with the triggering pulses provided by the triggering generator 10 to generate the train of discharge pulses g with a suitable time delay relative to the corresponding triggering pulses a and before the received signal portions due to the corresponding laser beams reach the pulse height holding circuit 30. Alternatively the discharge pulses g may be generated simultaneously with the corresponding triggering pulse a if desired. The discharge pulses g from the generator 32 each is applied to the pulse height holding circuit 30 to render the output therefrom null.

Then the output from the pulse height holding circuit 30 is supplied to the integrating circuit 34 to provided a waveform h as shown in FIG. 3. The waveform h is further deprived of noise components still remaining in the signal passed through the gate circuit 28 leading to an additional increase in signal-to-noise ratio. The signal-to-noise ratio can be further increased through the use of the integrating circuit 34 having a time constant sufficient large as compared with the pulse repetition period of laser beams. The output from the integrating circuit 34 is applied to the alarm circuit 36. If the signal portion due to the received laser beams is present during gated period of the gate circuit 28 and has an amplitude exceeding the peak value of the noise then the mean output h from the integrating circuit 34 increases whereby the system can detect an obstacle or the like located ahead thereof to produce an alarm signal from the alarm circuit 36. In order to determine if the signal portion due to the received laser beam exceeds the peak value of the noise, the output from the integration circuit 34 is preferably connected to a comparison circuit of the conventional construction where it is compared with a reference substantially corresponding to the peak value of the noise. The alarm signal then may energize either the associated buzzer (not shown) to provide an audio signal or the associated lamp (not shown) in order to signal a danger to the operator. Alternatively the alarm circuit may provide a signal for controlling the associated brake or a control for the associated engine although they are not illustrated in FIG. 1.

The arrangement of FIG. 1 is satisfactorily operated but somewhat disadvantageous in that an alarm signal is produced for the first time upon a dangerous distance having been reached. This disadvantage can be effectively eliminated by a modification of the invention as shown in FIG. 4 contemplating to acquaint the operator with a distance between his or her motor vehicle embodying the principles of the invention and a preceding motor vehicle or an obstacle located ahead thereof and also its status presented thereto.

A distance between that motor vehicle equipped with the present system and a preceding motor vehicle or an obstacle located ahead thereof is divided into a plurality of sections of distances. For example, that distance can be divided into three sections of distances or a section of short distances corresponding to dangerous distances, a section of moderate distances corresponding to distances required for the operator to call his or her attention, and a section of long distances corresponding to safe distances. Then one detection and alarm unit is disposed for each section of distances. FIG. 4 illustrates a collision preventing system constructed in accordance with the principles of the invention to be responsive to the three sections of distances just described.

Figure 4:
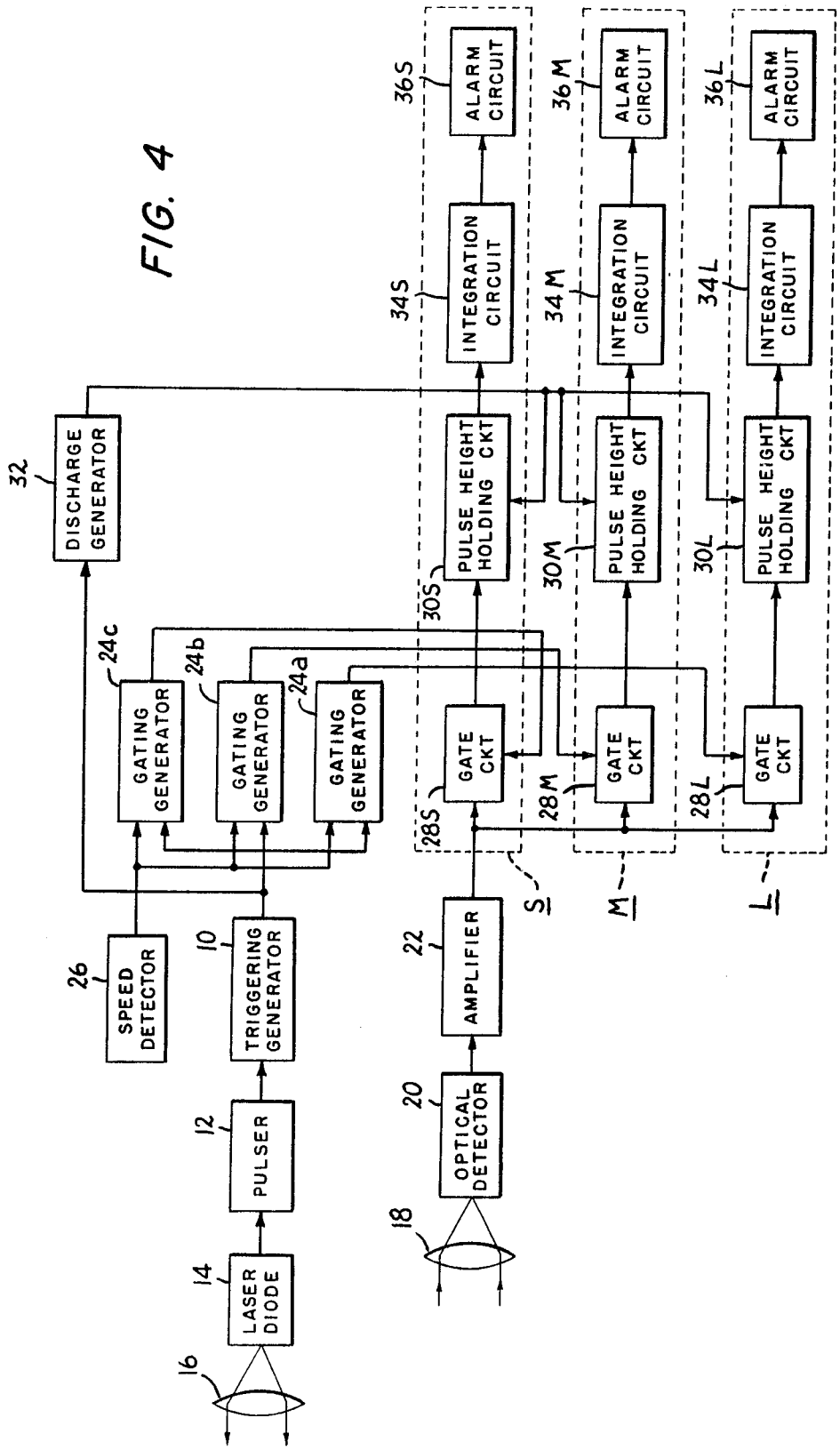
FIG. 4 is a block diagram of a modification of the invention.

As shown in FIG. 4, three gating generators identical in construction to that shown in FIG. 1 are disposed one for each of the long-distance section, moderate distance section and short-distance section and operatively coupled to the respective detection and alarm units each including the component identical in construction to the components 28, 30, 34 and 36 shown in FIG. 1 with the discharge generator 32 common to all the three units. The units for the sections of long, moderate and short distances are generally designated by the reference characters "L", "M" and "S" and the components of each unit are denoted by the same reference numerals designating the corresponding components as shown in FIG. 1 and suffixed with the reference character representing that unit. For example, the gate circuit 28L is provided for the section of long distances. Also the gating generators 24L, M and S are connected to the gate circuits 28L, M and S respectively and have inputs connected to the common speed detector 26.

The remaining components of the arrangement are identical to those shown in FIG. 1 and designated by the reference numerals identical to those used in FIG. 1.

In operation, the gating generators 24L, M and S are controlled with the triggering pulses (see waveform a shown in FIG. 5) from the triggering generator 10 to generate the respective gating pulses with a suitable duration in accordance with the speed signal from the speed detector 26 as shown at waveforms $d$-3, $d$-2 and $d$-1 in FIG. 5. The gating pulses $d$-1, $d$-2 and $d$-3 are shown in FIG. 5 as being delayed by time intervals of $t_1$, $t_2$ and $t_3$ with respect to the corresponding triggering pulses a, respectively. The gating pulses $d$-1, $d$-2 and $d$-3 are provided for the sections of short, moderate and long distances respectively and their time delays of $t_1$, $t_2$ and $t_3$ can be controlled in accordance with the speed of the motor vehicle as detected by the speed detector 26 as previously described.

For example, where the gating pulse d-2 for the moderate distance section and those signal portions corresponding to the received laser beams are applied to the gate circuit 28M at substantially the same time points as shown in FIG. 5, the waveform e as shown in FIG. 5 passes through that circuit to operate the detection and alarm unit M to signal an alarm to the operator in the same manner as above described in conjunction with FIGS. 1 and 3.

Similarly, the presence of the received signal portions in the section of short distances causes the operation of the detection and alarm unit S resulting in the corresponding alarm. This is true in the case the received signal portions are present in the section of long distances.

In this way a different one of alarms can be given in accordance with the particular intervehicular distance. For example, a red lamp may be energized for the section of short distances while a yellow and a green lamp may be energized for the sections of moderate and long distances respectively. Alternatively audio signals having different frequencies may be continuously produced in accordance with the intervehicular distance. Also an audio signal having a predetermined frequency may be differently intermitted. In addition, the associated brake may be actuated for the section of short distances and a control for the associated engine may be operated for the section of moderate distances.

The invention has several advantages. For example, an intervehicular distance or a distance up to a preceding motor vehicle or a frontward obstacle can be reliably measured without relying upon the judgement of distance with the operator's eye or intuition. The gate circuit 28 cooperates with the gating generator 24 to eliminate an interference due to any oppositely traveling motor vehicle equipped with the present system. Also the detected signal provides an alarm signal dependent upon the particular intervehicular distance for warning the operator. Further the associated brake or control for the engine may be automatically operated. In addition, due to the gating and integrating operations, only that signal portions due to the received laser beams can be efficiently picked up from the received optical signal leading to the detection of any target distant or low in reflection factor.

While the invention has been illustrated and described a few preferred embodiments thereof it is to be understood that various changes and modifications may be resorted to without departing from the spirit and scope of the invention. For example, instead of the laser light, any electromagnetic signal or any ultrasonic signal may be utilized. For electromagnetic signals, the laser diode 14 and the transmitting optical system 16 may be replaced by any suitable electromagnetic transmitter and any suitable transmitting antenna while the receiving optical system and the optical detector may be replaced by any suitable receiving antenna and any suitable electromagnetic receiver and detector. For ultrasonic signals, any suitable ultrasonic generator and the associated radiator may be substituted for the components 14 and 16 respectively and any suitable ultrasonic receiver may be substituted for the components 18 and 20.

What is claimed is:

1. In a system for preventing a collision of a motor vehicle with a target object, a combination comprising a triggering pulse generator for generating a train of triggering pulses having a predetermined pulse repetition frequency, signal generator means driven by said triggering pulse generator for producing an energy signal and for radiating said signal toward a target, detector means for detecting a signal reflected from said target, gating pulse generator means for generating a train of gating pulses having a pulse repetition frequency identical to that of said triggering pulses and having a phase difference with respect to said triggering pulses determined by the speed of the vehicle, gate circuit means coupled to said gating pulse generator means and said detector means for producing an output signal proportional to said reflected signal upon receipt of said gating pulses, pulse height holding circuit means having said output signal applied thereto for producing and holding a peak value signal of the output signal from said gate circuit means at each period of the pulse repetition frequency, and integrator circuit means having said peak value signal applied thereto for integrating said peak value signal and for producing an integrated output signal, whereby the signal-to-noise ratio of the signal received by said detector means is increased to cause said signal reflected from said target to be efficiently sensed.

2. In a system for preventing a collision of a motor vehicle with a target object, a combination comprising a triggering pulse generator for generating a train of triggering pulses having a predetermined pulse repetition frequency; signal generator means driven by said triggering pulse generator for producing an energy signal and for radiating said signal toward a target; detector means for detecting a signal reflected from the target; first, second and third gating pulse generator means for generating respective trains of gating pulses each having a pulse repetition frequency identical to said triggering pulses and having different phase relationships with respect to said triggering pulses determined by predetermined low, moderate and high speeds of the vehicle; first, second and third gate circuit means coupled respectively to said first, second, and third gating pulse generator means, and coupled to said detector means, wherein said gate circuit means are for producing respective first, second and third output signals proportional to said reflected signal upon receipt of the respective gating pulses from said gating pulse generator means; first, second and third pulse height holding circuit means having said first, second and third output signals respectively applied thereto producing and holding respective first, second and third peak value signals from said gate circuit means at each period of the pulse repetition frequency; first, second and third integration circuit means having said first second and third peak value signals applied respectively thereto for integrating the respective peak value signals to produce first, second and third integrated output signals, and first, second and third collision preventive means having said first second and third integrated output signals applied thereto for producing collision preventive signals whereby the signal-to-noise ratio of the signal received by said detector means is increased to cause said signal reflected from said target to be efficiently sensed in different modes in accordance with the low, moderate and high speeds of the vehicle.

* * * * *